United States Patent Office 2,975,845
Patented Mar. 21, 1961

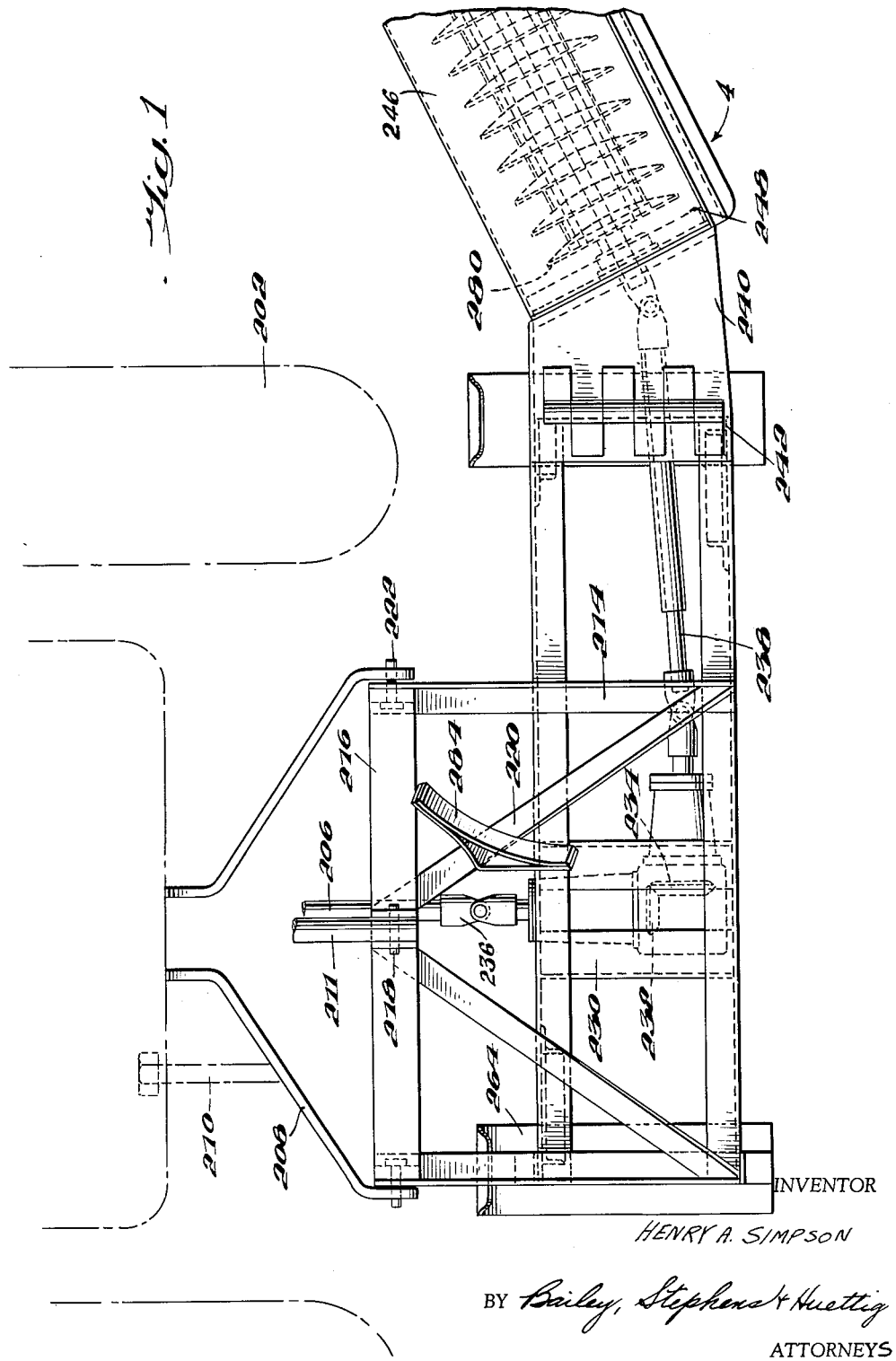

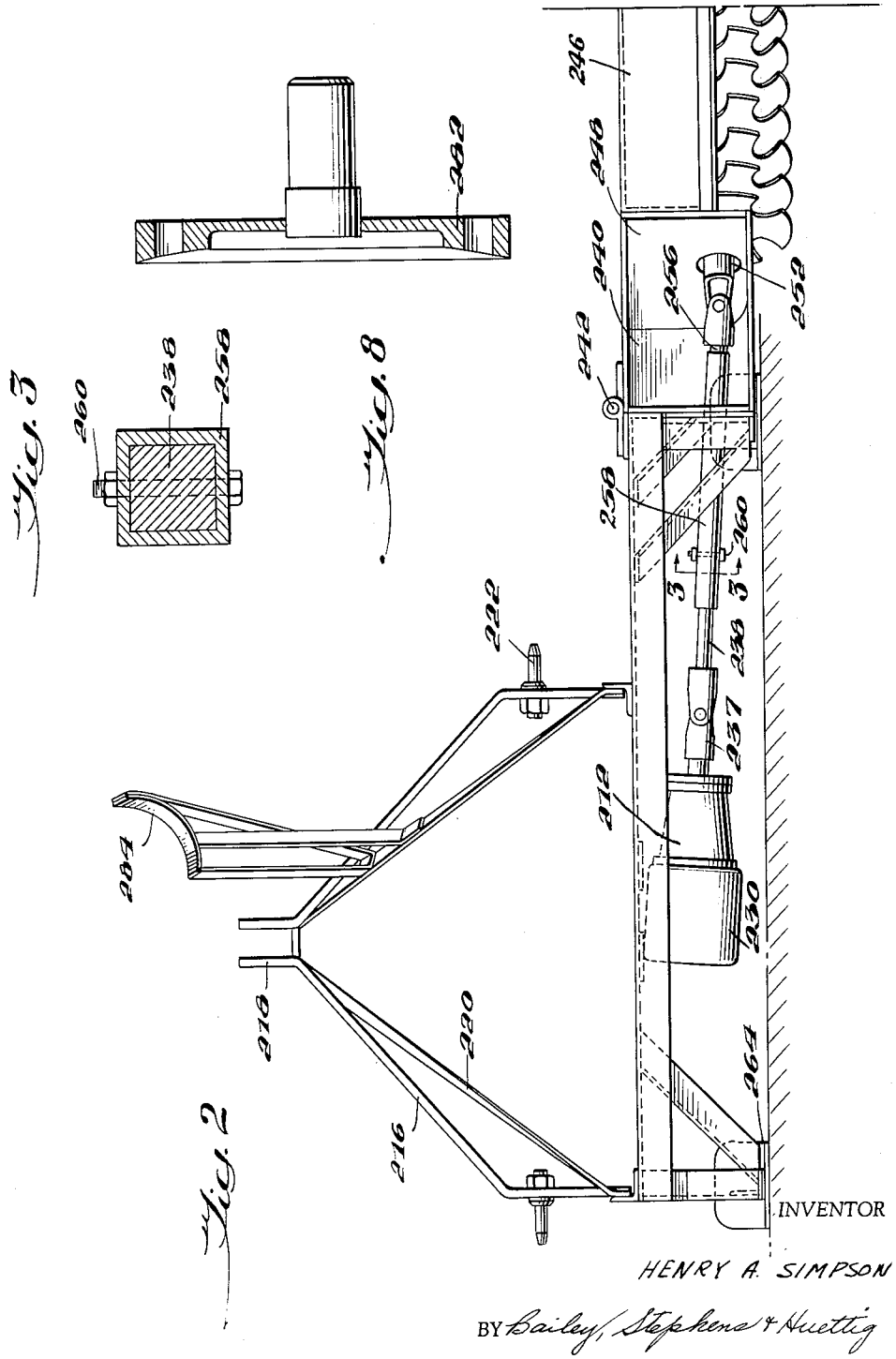

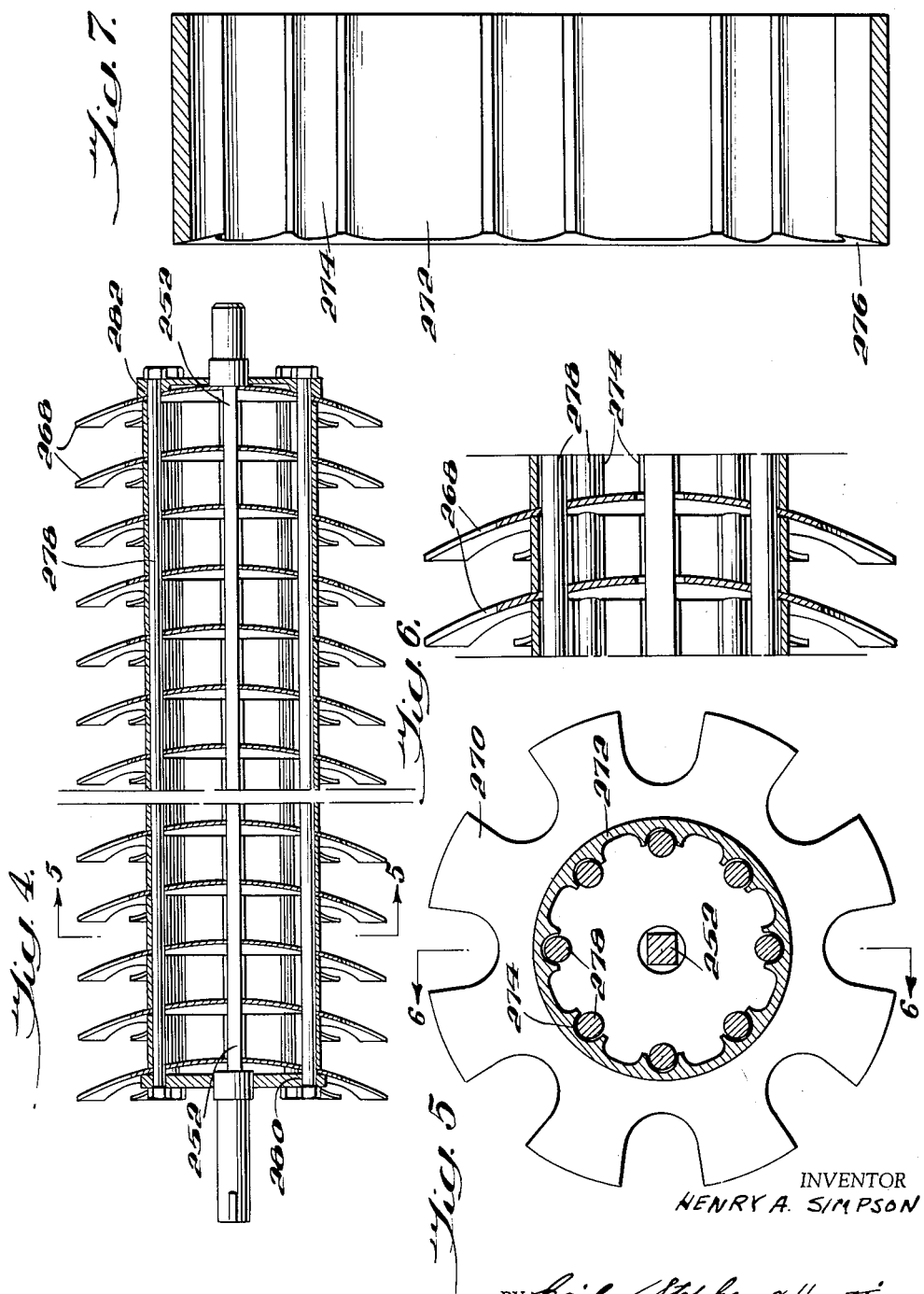

2,975,845

CULTIVATING MACHINE

Henry A. Simpson, Geneva, Fla.

Filed Jan. 22, 1958, Ser. No. 710,502

1 Claim. (Cl. 172—599)

The invention relates to cultivating machinery, and more especially to devices intended for cultivation around the base of trees, such as fruit trees.

This application is a continuation in part of my application S.N. 581,572, filed April 30, 1956, now abandoned.

At present, in orange groves and in orchards, it is usual to cut the grass and weeds in the area between the trees by machinery, but the areas beneath the trees are usually cultivated by hand, especially where the trees are low or have low-hanging branches. This hand cultivation is expensive, but some cultivation is necessary in order to maintain the yield of the trees. Also, hand cultivation often leaves a circular rim of soil, cut weeds and grass around the trees, which may in time build up to such an extent as to present a barrier to mechanical equipment working between the rows of trees and to interfere with distribution of fertilizer and water drainage around the tree. In addition, the hand hoeing, unless carefully done, may damage low-hanging branches of the tree.

The primary object of the present invention is to provide a machine for cultivating around trees which is of simple and inexpensive construction, but which is effective in destroying grass and weeds while leaving them as a mulch and in turning over the surface soil without damaging the roots of the tree.

Another object of the invention is to provide a machine which cultivates the area around the tree without forming a rim or ridge such as is often produced by hand hoeing.

A further object of the invention is to provide a machine of this type in which the cultivation is accomplished by rotating discs which, in contrast to the usual disc cultivators, cut into the ground only a short distance so that tree roots, which may be located close to the surface of the ground, will not be damaged.

Still another object of the invention is to provide an arrangement of this type which can be readily and quickly attached to and removed from a conventional tractor by one man, and can be operated by him, the device being so located as to make it easy for the driver to see what he is doing at all times and thus to avoid damage to the trees.

An additional object of the invention is to provide a drive for a series of discs on a shaft which is sturdy and effective, which does not damage the shaft and which permits ready replacement of damaged or broken discs.

Still a further object of the invention is to provide an arrangement for preventing injury to low-hanging tree branches when cultivating under the trees.

It is also an object of the invention to provide a device which can be so positioned on a tractor, when not in use, as to be substantially completely within the area of the tractor wheels, to allow transportation of the unit by the tractor on highways or narrow roads, the device when in use however extending a substantial distance to one side of the tractor.

The arrangement according to the invention can be mounted on the rear end of most tractors, can be driven by the conventional power take-off, and can be raised and lowered by the usual lifting mechanism. No special frame and no parts running between the wheels of the tractor are required.

In general, the invention contemplates the provision of a series of concave discs mounted on a common shaft, this shaft extending from the rear end of the tractor both laterally and forwardly. The discs are positively driven so as to turn at a peripheral speed greater than they would if merely rotated by their movement along the ground. Also, a shield is provided for the protection of low-hanging branches.

In another aspect, the invention contemplates a novel arrangement for mounting a series of discs on a common shaft and driving the discs as a unit, providing means separate from the shaft for transmitting motion from each disc to the next, so that the shaft serves merely as a support for the discs and is not subject to the driving torque which revolves the discs.

Further, the shaft and discs are so mounted that they can be swung upwardly beside or into line behind the tractor when the machine is to be carried on the highway or in narrow places.

Further objects and advantages of the invention will appear more fully from the following description, especially when taken in conjunction with the accompanying drawings which form a part thereof.

In the drawings:

Fig. 1 shows in plan view a mounting for the machine;

Fig. 2 is a rear view thereof;

Fig. 3 is a cross-section on the line 3—3 of Fig. 2;

Fig. 4 shows the cultivating member, looking in the direction of arrow 4 in Fig. 1;

Fig. 5 is a cross-section on the line 5—5 of Fig. 4;

Fig. 6 is a cross-section on the line 6—6 of Fig. 5;

Fig. 7 is a cross-section through one of the spacers; and

Fig. 8 is a cross-section through the outer end member.

In the device shown, the device is shown as mounted on a tractor having wheels 202, power take-off 206 and lift arms 208 connected at 210 to a hydraulic lifting mechanism, not shown. The tractor also has a top draw bar 211.

The mounting frame includes main frame members 212 connected by cross frame members 214. Forward frame elements 216 extend upward from the front ends of members 214 and are then bent inward into proximity with one another, ending in parallel vertical portions 218 which receive the draw bar between them and are pivoted to it. Upwardly and forwardly inclined braces 220 extend from the rear ends of members 214 and are connected at their upper ends to parts 216. Lift pins 222 on members 216 are engaged by lifting arms 208.

The supporting frame carries casing 230 in which are mounted meshing gears 232, 234 mounted respectively on a shaft connected by universal joint 236 to the power take-off 206 and on a shaft connected by universal joint 237 to drive shaft 238 of the cultivator.

On each end of the supporting frame are adjustably mounted ground-engaging shoes 264.

On one end of the supporting frame, a machine frame 240 is hinged by a hinge 242 having a horizontal, fore-and-aft axis. Secured on this frame 240, but angled forwardly therefrom, is an arcuate cover 246. This has an inner endwall 248 in which is mounted a bearing for shaft 252, connected by a universal joint to a shaft section 256 of square cross-section. Shaft 238 is also square (Fig. 3) and these two shafts (238, 256) are connected by a square sleeve 258 which can be held in position by bolt 260 or released and slid off of shaft 256 when the two shafts are to be disconnected, as when the cultivator is being carried in raised position as will be hereinafter described.

At its outer end, cover 246 has an end wall in which is mounted a bearing (not shown) for the other end of shaft 252. On this end is likewise arranged an adjustably mounted ground-engaging shoe (not shown).

The cultivator discs 268 with teeth 270 are mounted along shaft 252, but are not directly driven by it. The dics are of dished form, and are held in spaced relation by spacers 272 of cylindrical form (Fig. 7). The spacers have internal grooves 274 opposite holes in the discs 268. One edge 276 of each spacer is internally beveled so as to fit the convex face of the disc.

Bolts 278 extend through the whole assembly of discs and are located in grooves 274. Shaft 252 has secured on its inner end a drive flange 280, through which pass bolts 278. At its outer end it carries a dished flange 282 (Fig. 8), which fits the convex face of the outermost disc 268. The bolts also pass through holes in this flange, which is loosely mounted on shaft 252. When the bolts are tightened, they create sufficient friction between the drive flange, the discs and the spacers so that the discs are positively driven without reliance on the shaft 252, the drive being accomplished at points remote from the shaft, approximately at one half the radius of the shaft.

One of the frame members 220 carries a curved seat 284, which forms a support in which the mechanism can rest when it is tilted upward about axis 242, so that it can be carried in this raised position for travel.

Under some circumstances, it may be desirable to push the earth towards the base of the tree. For this purpose, the discs are arranged with their concave faces directed away from the tractor.

While I have described herein one embodiment of my invention, I wish it to be understood that I do not intend to limit myself thereby except within the scope of the claim hereto or hereinafter appended.

I claim:

In combination with a driven shaft, a plurality of circular cutter members mounted along said shaft, a disc fixed on said shaft for rotation therewith, said disc and each of said cutter members having a plurality of holes therein spaced from the centers thereof and angularly spaced therearound, said cutter members being arranged side by side in spaced relation with their centers in the line of the axis of the shaft, a plurality of bolts extending througfh the holes of the disc and cutter members and spaced outwardly from the shaft, means associated with said bolts engaging the cutter member furthest from the disc, and annular spacers with cylindrical outer walls between each adjacent pair of cutter members, said bolts extending through the interior of the spacers, said disc forming the sole driving connection between the cutter members and the shaft, said spacers frictionally engaging cutter members to transmit movement therebetween, the length of each spacer being substantially greater than the thickness of one of the discs, said cutter member engaging means comprising a second disc having holes therethrough through which all of the bolts extend, said spacers having grooves on their inner wall surfaces engaging over said bolts.

References Cited in the file of this patent

UNITED STATES PATENTS

| 1,119,143 | Elsas | Dec. 1, 1914 |
| 1,729,073 | Johnston | Sept. 24, 1929 |
| 1,996,676 | Hargrave | Apr. 2, 1935 |
| 2,604,026 | Latta | July 22, 1952 |
| 2,702,974 | Wiesenthal | Mar. 1, 1955 |

FOREIGN PATENTS

| 684,202 | Great Britain | Dec. 10, 1952 |